United States Patent

Cromer et al.

(10) Patent No.: US 8,065,428 B2
(45) Date of Patent: Nov. 22, 2011

(54) COMPUTER PATCH MANAGEMENT IN "ROAD WARRIOR" CONTEXTS

(75) Inventors: Daryl Cromer, Cary, NC (US); Richard W. Cheston, Morrisville, NC (US); Howard Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 381 days.

(21) Appl. No.: 11/694,485

(22) Filed: Mar. 30, 2007

(65) Prior Publication Data

US 2008/0244079 A1 Oct. 2, 2008

(51) Int. Cl.
- *G06F 15/16* (2006.01)
- *G06F 15/173* (2006.01)
- *G06F 9/44* (2006.01)

(52) U.S. Cl. ........ 709/232; 709/224; 717/171; 717/172; 717/173

(58) Field of Classification Search .................. 709/224, 709/232; 717/168–173
See application file for complete search history.

(56) References Cited

U.S. PATENT DOCUMENTS

| 6,631,469 | B1 | 10/2003 | Silvester ........................... 713/2 |
| 6,986,133 | B2 * | 1/2006 | O'Brien et al. ................ 717/173 |
| 2002/0198963 | A1 | 12/2002 | Wu et al. ........................ 709/219 |
| 2003/0135858 | A1 * | 7/2003 | Nemoto ........................... 725/75 |
| 2004/0004540 | A1 * | 1/2004 | Komatsu et al. ........... 340/426.18 |
| 2005/0180326 | A1 * | 8/2005 | Goldflam et al. ............. 370/231 |
| 2006/0103963 | A1 | 5/2006 | Adapathya et al. ............. 360/60 |
| 2006/0190938 | A1 | 8/2006 | Capek et al. .................. 717/161 |
| 2007/0054658 | A1 | 3/2007 | Guyard et al. |
| 2007/0192763 | A1 * | 8/2007 | Helvick ........................ 717/168 |
| 2007/0253093 | A1 * | 11/2007 | Cook et al. ..................... 360/75 |

FOREIGN PATENT DOCUMENTS

| EP | 0813707 | 12/1997 |
| EP | 1071259 A2 | 1/2001 |
| EP | 1416697 A2 | 5/2004 |
| GB | 2372587 A | 8/2002 |

OTHER PUBLICATIONS

IBM Active Protection System, Whitepaper, Oct. 2003.

* cited by examiner

*Primary Examiner* — Joseph Avellino
*Assistant Examiner* — Jeong S Park
(74) *Attorney, Agent, or Firm* — Ference & Associates LLC

(57) ABSTRACT

Methods and arrangements for facilitating and streamlining patch management in "road warrior" and analogous contexts. Particularly, there are broadly contemplated herein, in accordance with at least one presently preferred embodiment of the present invention, methods and arrangements for facilitating determinations of suitable times for enabling system updates and/or downloads.

20 Claims, 3 Drawing Sheets

COMPUTER PATCH MANAGEMENT IN "ROAD WARRIOR" CONTEXTS

FIELD OF THE INVENTION

The present invention relates to patch management, including the downloading of updates, in various contexts but particularly in the context of traveling or intermittent personal computer (PC) users.

BACKGROUND OF THE INVENTION

Patch management has become a significant issue for all PC users. Generally, all users can relate to pop-ups and warnings that indicate the downloading of a "patch", such as a software update, as might originate from one's internet service provider or another entity. Patch management is also common in corporate contexts, where a corporate IT (information technology) department will frequently send patches to individual desktops for download. Of course, the annoyance factor for a typical user is often quite significant as delays associated with patch downloads can interfere with one's work.

"Road warriors", or corporate individuals who find themselves traveling a great deal with a portable PC such as a laptop, find patch management to present problems on different levels. For one thing, road warriors might not have access to high-bandwidth connections which would make patch management a more feasible or accessible procedure; in some contexts lacking high-bandwidth connections patch management downloads might not even be attainable or, if they are, might come through only at a considerably slow transmission rate. On the other hand, because of the transient nature of road warriors' connections to any network, the time windows for even accepting a patch management download might be severely limited. It would thus often oblige them to ignore, deflect or reject patch management downloads when possible so that the limited time during which they may be connected is not monopolized by cumbersome download procedures. Similar challenges of course often present themselves to users in non-corporate contexts involving a great deal of travel and/or transient computer usage, so the term "road warrior" need not necessarily be construed to apply to the corporate context just described.

U.S. Patent Publication No. 20060190938 (Lenovo) discloses a procedure for pre-emptively rejecting patch management downloads by way of an "away" button which communicates to external sources that the user will be "away" from the machine for a period of time. However, this solution essentially requires the user to be keenly knowledgeable of the away button function and highly diligent in using it. Thus, one who has not had time to become well-versed in such a function or cannot find the time to adequately manage its use will not get the most productive use out of the function.

Accordingly, a compelling need has been recognized in connection with providing a more user-friendly and efficient arrangement for pre-emptively rejecting patch management downloads in road warrior (and analogous) contexts.

SUMMARY OF THE INVENTION

Broadly contemplated herein, in accordance with at least one presently preferred embodiment of the present invention, are methods and arrangements for facilitating determinations of suitable times for enabling system updates and/or downloads, in road warrior and analogous contexts as previously described.

In summary, one aspect of the invention provides a method comprising: establishing a predetermined time frame during which to permit downloads at a computer; establishing at least one condition for permitting downloads during the predetermined time frame; querying a status of the at least one condition during the predetermined time frame; and responsive to the querying, rendering the computer receptive to downloads.

Another aspect of the invention provides a system comprising: a module for establishing a predetermined time frame during which to permit downloads at a computer; a module for establishing at least one condition for permitting downloads during the predetermined time frame; a querying module which queries a status of the at least one condition during the predetermined time frame; and an activation module which, responsive to the querying, renders the computer receptive to downloads.

Furthermore, an additional aspect of the invention provides a program storage device readable by machine, tangibly embodying a program of instructions executable by the machine to perform method steps, the method comprising: establishing a predetermined time frame during which to permit downloads at a computer; establishing at least one condition for permitting downloads during the predetermined time frame; querying a status of the at least one condition during the predetermined time frame; and responsive to the querying, rendering the computer receptive to downloads.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
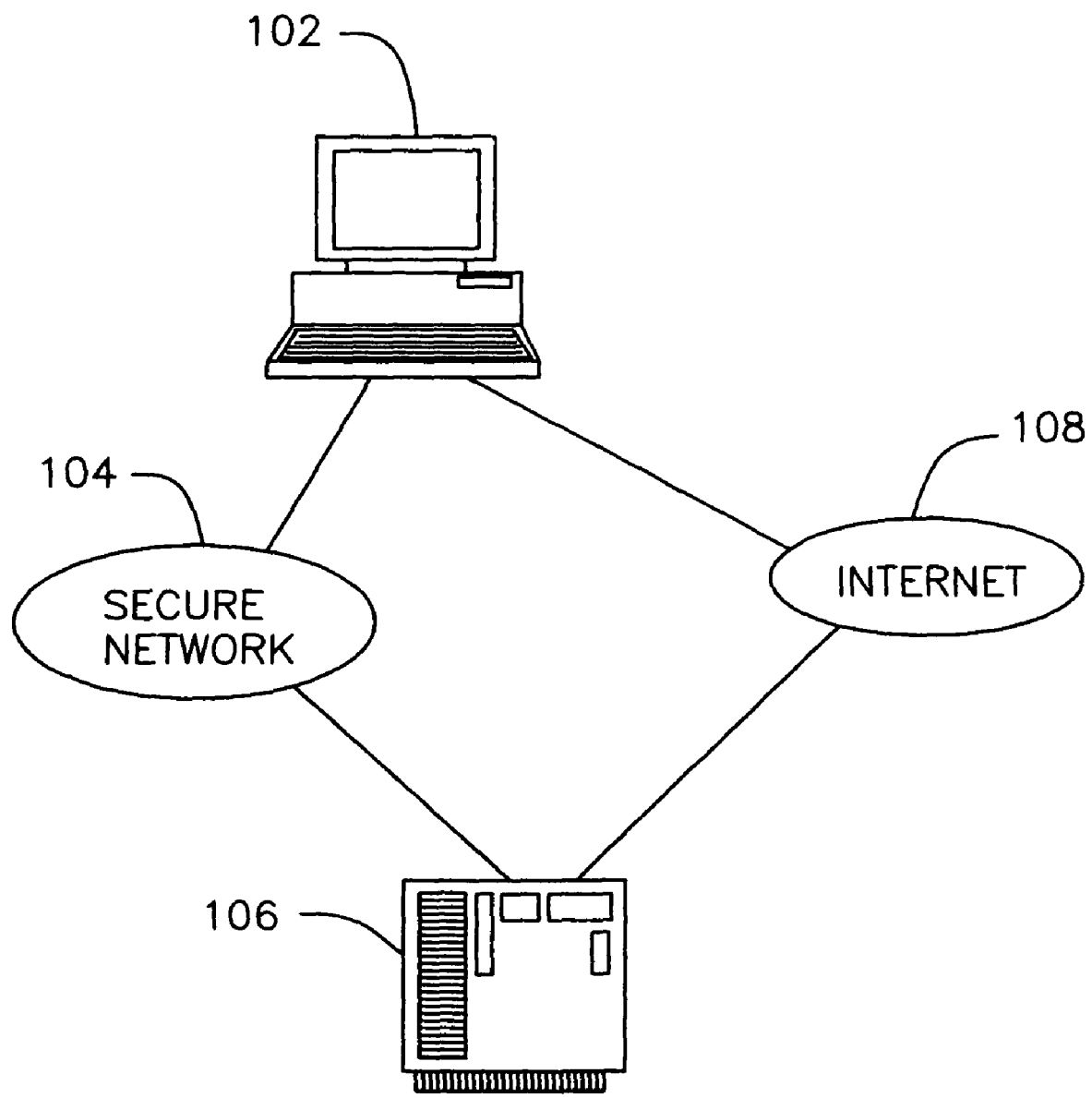
FIG. 1 is a simplified block diagram of a client/server system.
Figure 2:
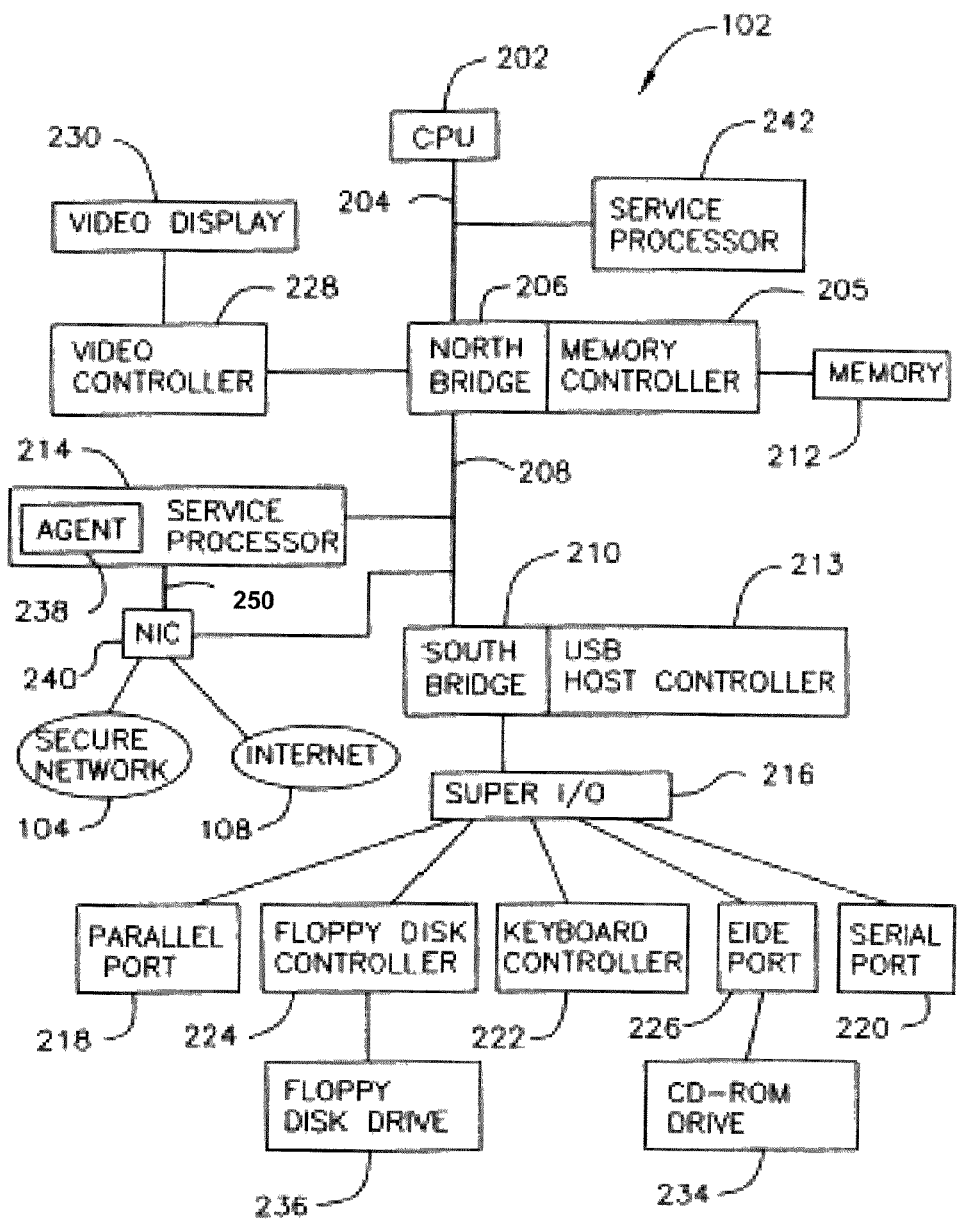
FIG. 2 is a block diagram of a computer on which embodiments of the invention may be implemented.
Figure 3:
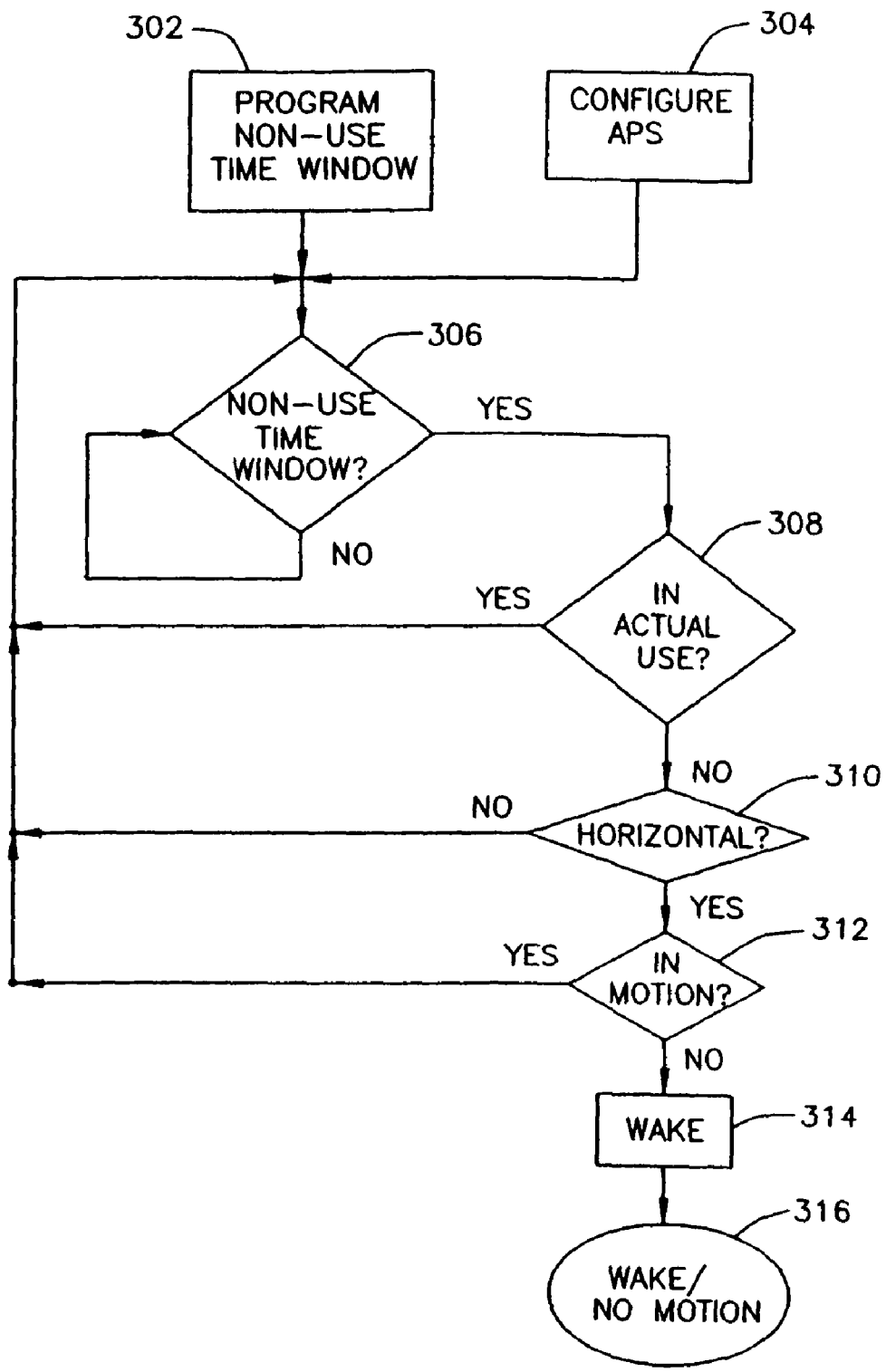
FIG. 3 provides a flowchart of an illustrative method to facilitate determinations of suitable times for enabling system updates and/or downloads, in road warrior and analogous contexts.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

The preferred embodiment is described in terms of a client/server system; however, those skilled in the art will recognize that the invention may be practiced on any computer system which is used interactively by a human user.

Referring now to the drawings, and more particularly to FIG. 1, there is shown, in simplified block diagram form, a client/server system on which the present invention may be implemented. A client 102, such as a personal computer (PC) is connected via a secure network 104, such as a local area network (LAN), to a server 106. Here, the client 102 may be a laptop or notebook computer as used by a "road warrior" or other traveling or transient user.

Both the client 102 and the server 106 may be connected to a wide area network (WAN) or global network, such as the Internet 108. Connection to the Internet 108 may be limited to the server 106, and access to the Internet by the client 102 would then be via the server 106 through the secure network 104. In any case, the client/server system would be protected a hardware and/or software firewall (not shown).

As will become clear from the following description, the invention can be implemented at any one of the client 102, the server 106 or, in some cases, by a third party over the Internet 108. In some applications, the implementation may be a combination of two or more of these. For example, the client 102 might keep track of idle time and report the history to the server 106 which would determine the priority of and initiate the various maintenance tasks. Rather than the server 106 performing this last function, a third party service provider could perform the function. Various other implementations will suggest themselves to those skilled in the art, and a specific implementation will depend on a particular implementation and company policy.

In practice, the client/server network is much more complex than depicted in FIG. 1. Typically, there are a great many clients 102, and these may be a variety of desktop and laptop PCs, such as IBM's ThinkCentre series desk top PCs and IBM's ThinkPad series lap top PCs. Moreover, the secure network 104 may be a combination of hardwired and wireless infrastructure. Also, there are a plurality of servers 106, arranged in a server "farm" performing various functions, such as IBM's xSeries Express and BladeCenter servers. In the practice of the invention, the processes performed may be performed solely on clients 102, solely on the servers 106, or a combination of client and server operations.

A client 102 is illustrated in more detail in the block diagram of FIG. 2. It should be noted that the architecture shown in FIG. 2 is not limited to a computer in a network but equally well illustrates a standalone computer not connected to a network. The invention can be implemented on such a standalone computer. Referring to FIG. 2, the central processing unit (CPU) 202 is supported by a chipset that includes a so-called North Bridge chip or chips 206 and a so-called South Bridge chip 210. In the North Bridge/South Bridge chipset architecture, the South Bridge 210 controls all of the computer's input/output (I/O) functions, including the basic input/output system (BIOS). All the functions of the CPU 202, except memory, PCI (Peripheral Component Interface) and AGP (Accelerated Graphics Port), are controlled by the South Bridge 210.

More particularly, the CPU 202 is connected to the North Bridge chip(s) 206 by a high speed bus 204, referred to as the front side bus (FSB), which provides the connection to the random access memory (RAM) 212, via memory controller 205, and the video controller (AGP) 228. The video controller 228 is, in turn, connected to a video display 230. The CPU 202 may be supported by a service processor 242 connected the FSB 204. The South Bridge chip 210 is connected to the North Bridge chip(s) 206 via a PCI bus 208. There may be various PCI expansion slots (not shown) connected to the PCI bus 208, depending on the specific design of the client 102. In addition to possible PCI expansion slots, a service processor 214 and a network interface card (NIC) 240 are connected to the PCI bus 208. The NIC 240 provides the connection to the secure network 104 and the Internet 108 under the control of the service processor 214 via bus 250. The service processor 214 is, in turn, controlled by a firmware agent 238.

As mentioned, the South Bridge chip 210 controls the computer's I/O functions, and these include the universal serial bus (USB) host controller 213 and, through the super I/O chip 216, various legacy I/O ports including the parallel port 218 and serial port 220, the functions of which are largely being supplanted by USB connections. In addition, the super I/O chip 216 controls other I/O devices, such as floppy disk controller 224 connected to floppy disk drive 236, keyboard controller 222, and enhanced integrated drive electronics (EIDE) port 226, to which, for example, an optical disk drive, such as a compact disk-read only memory (CD-ROM) drive 234, may be connected. Other EIDE drives (not shown), such as hard disk drives and digital versatile disk (DVD) drives may also be connected to the EIDE port 226. The super I/O chip 216 may also support the newer serial advanced technology attachment (SATA) devices. Other I/O devices may be connected to either or both the PCI bus 208 or the super I/O chip, depending on the design of the specific client 102.

The several clients in the client/server system shown in FIG. 1 will not all have precisely the same architecture. The architecture(s) of server(s) 106 is similar to that of the client 102 shown in FIG. 2 but differs primarily in the I/O functions supported. Each of the client 102 and the server 106 will have a software operating system (OS) loaded, but the operating systems will differ somewhat between client and server, again to support the functions of those computers.

The client OS requires that certain maintenance tasks be performed periodically to maintain the health of the system. For example, these tasks include running defragmentation and virus scans and running live updates and downloading and installing patches. While IT personnel might set up individual client computers so as to perform these maintenance tasks periodically at specific times, not all persons have the same schedules, and in many cases the set times interfere with a user's desire to use his or her computer. The embodiments of the present invention recognize and address this problem and others, as discussed heretofore.

There is broadly contemplated herein, in accordance with at least one presently preferred embodiment of the present invention, a method of determining suitable times at which a client OS can be enabled for system updates or downloads, in "road warrior" or analogous contexts. Preferably, a solution involves an active protection system (APS) and a heuristic algorithm Preferably, a heuristic algorithm is employed to determine a time window when software may be conveniently downloaded to a client OS (e.g., during known "off hours"). For instance, the algorithm may preferably determine or ascertain a client OS working pattern based on location, which itself may be determined from a type of connection being used or an access point. More particularly, potential time windows may preferably be determined based on the potential size of a download, an expected connection type or context, and expected downtime or non-use time (e.g., a definition of "off hours"). Preferably, such a non-use time window can be programmed (or set) into one or more registers of the computer OS. Also, an APS can preferably be configured to determine the status of one or more predetermined parameters during a non-use time window, such as the physical orientation of the computer and/or whether or not it is in translational motion, and/or whether it is even possibly in use during the non-use time (which could serve to deflect or reject any incoming downloads or updates). Generally, some items that can be considered in a heuristic algorithm are: time of day (including local time), movement patterns, amount of idle time, historical values of different parameters.

FIG. 3 thus provides a flowchart of a method that may be employed, in accordance with a preferred embodiment of the present invention, to facilitate determinations of suitable times for enabling system updates and/or downloads, in road warrior and analogous contexts as previously described. FIG. 3 shows but an illustrative example, which is not to be construed as restrictive; analogous methods utilizing different method steps may of course be employed in the context of various embodiments of the present invention.

First, a non-use time window is established or set (302). Though this time window can of course be set or established manually, it preferably is set or established automatically. Preferably, the computer may monitor the user's activity and build a profile of the best time window(s) during which updates may be performed. At some point, an APS is also configured to monitor one or more parameters to the extent they are desired for influencing whether or not downloads/updates will be accepted (304); examples of such parameters will be appreciated below.

If it is established (306) that a non-use time window is not in effect, then preferably no downloads/updates will be permitted and such a "status quo" is maintained. If, however, the non-use time window is indeed in effect, then preferably a first parameter can be examined. In FIG. 3, this parameter is an actual usage condition of the computer (308); for instance, if the user has chosen to actually use the computer during a non-use time window, then the status quo can be maintained with no downloads/updates permitted. On the other hand, if it is not in use, a second parameter can be evaluated (310). Here, the second parameter is the condition of whether the computer is horizontal (such as on a table) or not (such as when a laptop is being carried in a bag).

If a second parameter as just described warrants a next step (as opposed to a return to status quo), then a third parameter may preferably be evaluated via the APS (312), such as whether the computer is in motion. If the computer is determined not to be in motion, then the computer can preferably be awoken (314) in known manner to thereby establish (316) a status of "Wake/No Motion". This could subsequently prompt a boot and/or initiation or resumption of a predetermined sequence for downloading one or more files. Of course, "Wake/No Motion" represents but one example of a system status that could represent a "benchmark" or set of conditions that need to be fulfilled if downloading/updating is to be permitted; a very wide variety of other types of benchmarks or prompting conditions are certainly conceivable.

With regard to FIG. 3, to the extent that method steps are indicated within flowchart symbols, it should be understood that each such flowchart symbol can likewise be construed as a module within the operating system of the computer, or even at a location remote from the computer, that is configured for performing the indicated method step. This also applies to method steps that are analogous to or interchangeable with those steps specifically set forth in FIG. 3 and that lie broadly within the scope of the embodiments of the present invention. For instance, one other parameter that could be considered is whether the computer's antenna is disabled or there is no LAN connection; in such situations, for instance, the computer might remain "asleep" instead of being awoken. The antenna parameter might be important, e.g., since one would not want to awake the system if an airplane is traveling down a runway. Another parameter could be, e.g., the amount of time that has elapsed with no motion of the computer. For small time periods in that regard, e.g., on the order of a few seconds, it of course might be undesirable to go to the trouble of waking the computer. Instead, a predetermined (and preferably pre-programmed or pre-set) "no-motion" time interval could be established, such as several minutes, during which waking the computer is not possible.

The use of an APS in the contexts described and contemplated hereinabove can be by way of an actual APS associated with the computer or by external logic wherein an APS provides motion input. Suitable APS systems, which may be employed in accordance with the embodiments of the present invention, can be found, e.g., in U.S. Patent Publication No. 20060103963, "Hard Drive Protection Override", assigned to Lenovo Pte (Singapore) Ltd.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   establishing a predetermined time frame during which to permit downloads at a computer;
   establishing at least one current use related condition for permitting downloads during the predetermined time frame;
   utilizing a processor to query a status of the at least one current use related condition during the predetermined time frame; and
   responsive to said querying, rendering the computer receptive to downloads;
   wherein said at least one current use related condition is selected from the group consisting of a physical orientation of the computer during the predetermined time frame as detected by at least one accelerometer, and whether the computer is in translational motion during the predetermined time frame as detected by the at least one accelerometer;
   wherein the computer is rendered receptive to downloads during the predetermined time frame responsive to the computer experiencing no translational motion for a predetermined no-motion time interval.

2. The method according to claim 1, wherein said establishing of a predetermined time frame is established based on one or more of a size of download, a connection type of the computer, a manual setting, and an expected non-use time of the computer.

3. The method according to claim 1, wherein said establishing of at least one current use related condition comprises employing an APS to establish at least one current use related condition for permitting downloads during the predetermined time frame.

4. The method according to claim 1, further comprising the step of monitoring a status of the at least one current use related condition.

5. The method according to claim 4, wherein said monitoring comprises employing an APS to monitor a status of the at least one current use related condition.

6. The method according to claim 1, wherein said rendering comprises waking the computer.

7. The method according to claim 6, wherein waking the computer further comprises determining whether the computer's antenna is disabled.

8. The method according to claim 7, wherein waking the computer further comprises determining whether the computer is connected to a network.

9. The method according to claim 6, further comprising initiating or resuming downloading of a predetermined sequence of one or more files responsive to waking the computer.

10. The method according to claim 6, further comprising prompting a boot of the computer responsive to waking the computer.

11. The method according to claim 1, wherein the at least one current use related condition includes whether the computer is in actual use during the predetermined time frame.

12. The method according to claim 1, wherein querying a status of the at least one current use related condition during the predetermined time frame occurs at one or more of: the computer, a server, and a third party over the Internet.

13. A system comprising:
    one or more processors;
    one or more modules executable by the processors, the one or more modules comprising:
    a module for establishing a predetermined time frame during which to permit downloads at a computer;
    a module for establishing at least one current use related condition for permitting downloads during the predetermined time frame;
    a querying module which queries a status of the at least one current use related condition during the predetermined time frame; and
    an activation module which, responsive to said querying, renders the computer receptive to downloads;
    wherein said at least one current use related condition is selected from the group consisting of a physical orientation of the computer during the predetermined time frame as detected by at least one accelerometer, and whether the computer is in translational motion during the predetermined time frame as detected by the at least one accelerometer;
    wherein the computer is rendered receptive to downloads during the predetermined time frame responsive to the computer experiencing no translational motion for a predetermined no-motion time interval.

14. The system according to claim 13, wherein said predetermined time frame is established based on one or more of a size of download, a connection type of the computer, a manual setting, and an expected non-use time of the computer.

15. The system according to claim 13, wherein said module for establishing at least one current use related condition acts to employ an APS to establish at least one condition for permitting downloads during the predetermined time frame.

16. The system according to claim 13, further comprising a monitoring module which monitors a status of the at least one current use related condition.

17. The system according to claim 16, wherein said monitoring module acts to employ an APS to monitor a status of the at least one condition.

18. The system according to claim 13, wherein said activation module acts to wake the computer.

19. The system according to claim 13, wherein the at least one current use related condition includes whether the computer is in actual use during the predetermined time frame.

20. A program storage device readable by machine, tangibly embodying a program of instructions executable by the machine to perform steps comprising:
    establishing a predetermined time frame during which to permit downloads at a computer;

establishing at least one current use related condition for permitting downloads during the predetermined time frame;

querying a status of the at least one current use related condition during the predetermined time frame; and responsive to said querying, rendering the computer receptive to downloads;

wherein said at least one current use related condition is selected from the group consisting of a physical orientation of the computer during the predetermined time frame as detected by at least one accelerometer, and whether the computer is in translational motion during the predetermined time frame as detected by the at least one accelerometer;

wherein the computer is rendered receptive to downloads during the predetermined time frame responsive to the computer experiencing no translational motion for a predetermined no-motion time interval.

* * * * *